(12) United States Patent
Mallik

(10) Patent No.: US 6,533,884 B1
(45) Date of Patent: Mar. 18, 2003

(54) METHOD AND SYSTEM FOR EXTRUSION EMBOSSING

(75) Inventor: Donald W. Mallik, Atlanta, GA (US)

(73) Assignee: Printpack Illinois, Inc., Elgin, IL (US)

( * ) Notice: Subject to any disclaimer, the term of this patent is extended or adjusted under 35 U.S.C. 154(b) by 91 days.

(21) Appl. No.: 09/705,984

(22) Filed: Nov. 3, 2000

(51) Int. Cl.⁷ .............................................. B32B 31/06
(52) U.S. Cl. ................... 156/209; 156/244.11
(58) Field of Search ................................. 156/461, 470, 156/500, 581, 582

(56) References Cited

U.S. PATENT DOCUMENTS

| | | | |
|---|---|---|---|
| 1,960,997 A | 5/1934 | Halloran | |
| 2,070,600 A | 2/1937 | Jenett | |
| 2,815,308 A | 12/1957 | Robinson | |
| 3,024,154 A | 3/1962 | Singleton et al. | |
| 3,481,818 A | * 12/1969 | Wellen | 101/22 |
| 3,922,473 A | * 11/1975 | Kosaka et al. | 156/332 |
| 3,948,709 A | 4/1976 | Ida et al. | |
| 3,956,056 A | 5/1976 | Boguslawski et al. | |
| 4,085,244 A | * 4/1978 | Stillman | 206/484 |
| 4,105,491 A | * 8/1978 | Haase et al. | 156/209 |
| 4,370,187 A | 1/1983 | Katagiri et al. | |
| 4,407,689 A | * 10/1983 | Ohtsuki et al. | 156/243 |
| 4,556,527 A | 12/1985 | Sarcander | |
| 4,574,021 A | 3/1986 | Endres et al. | |
| 4,612,152 A | 9/1986 | Kawabata et al. | |
| 4,634,484 A | * 1/1987 | Wagner | 156/219 |
| 4,657,614 A | 4/1987 | Andersson | |
| 4,826,560 A | 5/1989 | Held | |
| 4,844,766 A | 7/1989 | Held | |
| 4,854,996 A | 8/1989 | Baus | |
| 4,891,235 A | 1/1990 | Mitzuguchi et al. | |
| 4,929,474 A | 5/1990 | Avni et al. | |
| 4,987,014 A | 1/1991 | Woodward et al. | |
| 4,990,375 A | 2/1991 | Swihart | |
| 4,995,930 A | 2/1991 | Merz et al. | |
| 5,006,056 A | 4/1991 | Mainstone et al. | |
| 5,098,497 A | * 3/1992 | Brinley | 156/219 |
| 5,203,941 A | 4/1993 | Spain et al. | |
| 5,281,371 A | 1/1994 | Tamura et al. | |
| 5,282,915 A | 2/1994 | Westlake, Jr. | |
| 5,312,578 A | 5/1994 | Aladenize et al. | |
| 5,316,608 A | 5/1994 | Ocampo et al. | |
| 5,330,595 A | 7/1994 | Held | |
| 5,554,333 A | 9/1996 | Fujiki | |
| 5,639,331 A | 6/1997 | Payne | |
| 5,676,791 A | 10/1997 | Christel | |
| 5,697,027 A | * 12/1997 | Takagi et al. | 399/279 |
| 5,698,054 A | 12/1997 | Biagioli et al. | |
| 5,723,199 A | 3/1998 | Boot | |
| 5,738,754 A | 4/1998 | Hill et al. | |
| 5,833,792 A | 11/1998 | Funaki et al. | |
| 5,849,129 A | 12/1998 | Hogge et al. | |
| 5,849,137 A | 12/1998 | Hogge et al. | |
| 5,861,074 A | 1/1999 | Wu | |
| 5,865,926 A | 2/1999 | Wu et al. | |
| 6,013,151 A | 1/2000 | Wu et al. | |
| 6,129,800 A | 10/2000 | Brinley | |
| 6,136,414 A | 10/2000 | Aizawa et al. | |

* cited by examiner

Primary Examiner—Michael W. Ball
Assistant Examiner—Gladys Corcoran
(74) Attorney, Agent, or Firm—Sutherland Asbill & Brennan LLP

(57) ABSTRACT

The present invention provides a novel method and system for extrusion embossing. In particular, the present invention provides a method and system for embossing a multi-layer flexible packaging material whereby one layer is embossed simultaneously with the extrusion of an adjacent layer and the lamination of an additional layer.

19 Claims, 2 Drawing Sheets

Figure 1A:
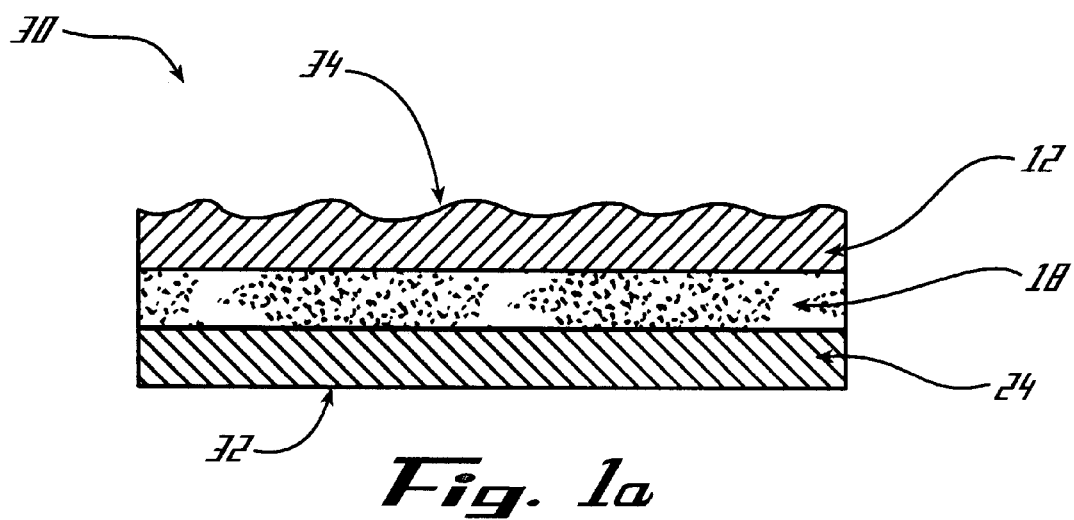

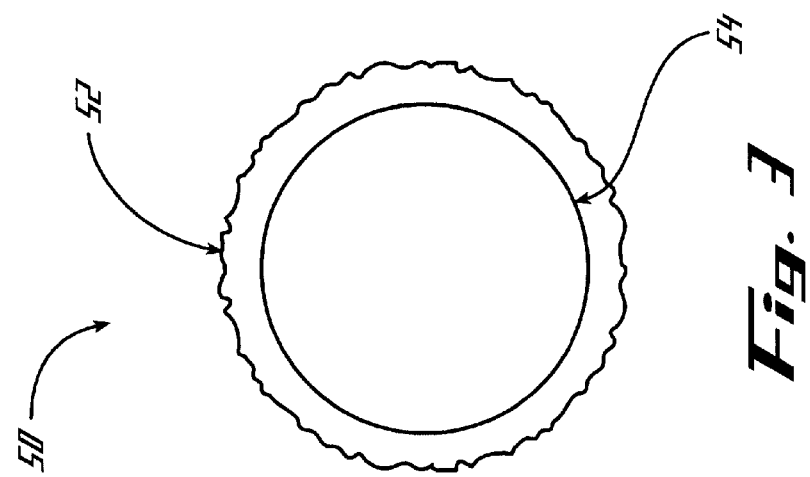
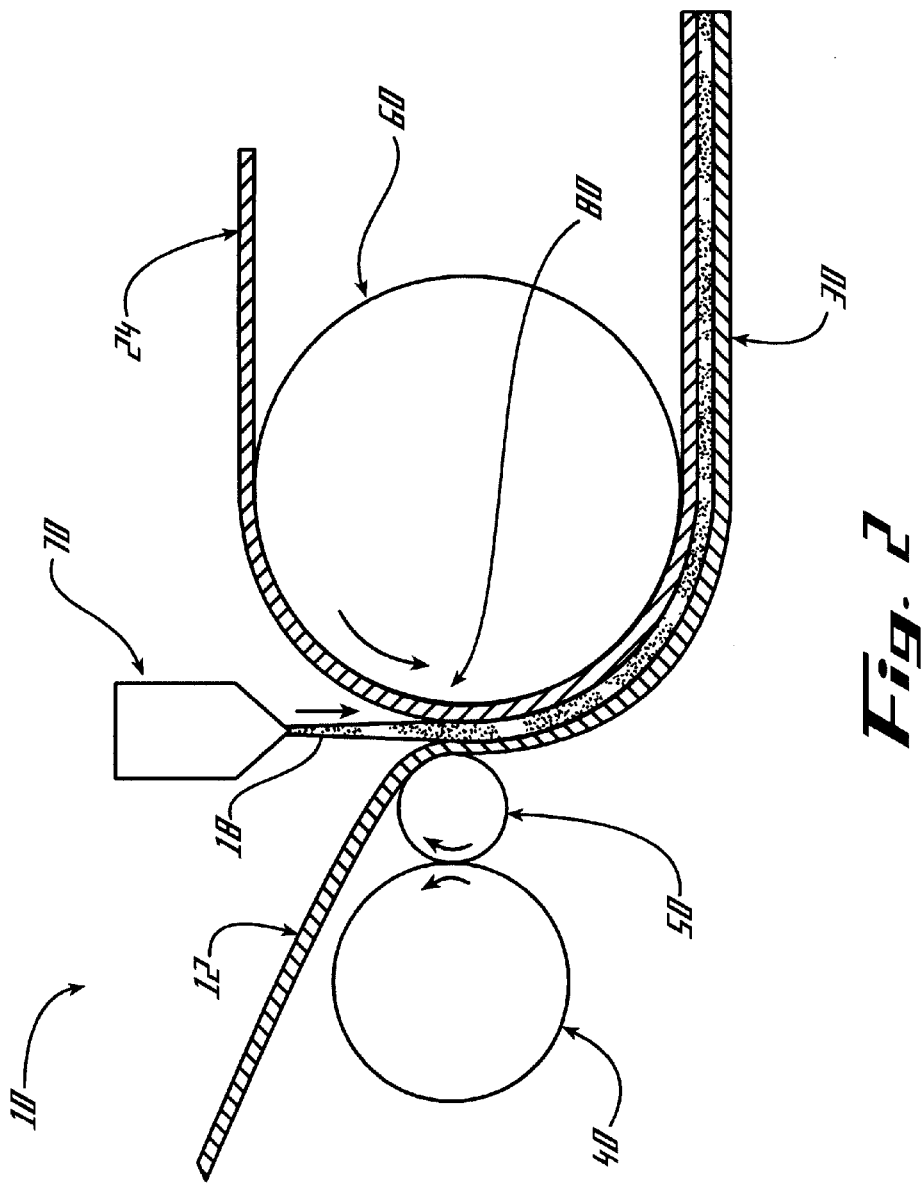

METHOD AND SYSTEM FOR EXTRUSION EMBOSSING

FIELD OF THE INVENTION

The present invention relates to the packaging industry, and more particularly to a method and system for making an embossed multi-layer flexible packaging material.

BACKGROUND OF THE INVENTION

The art of embossing entails applying pressure to a material and thereby causing the formation of a raised pattern in the material. Prior art methods usually include the use of a rigid embossing roller and a soft backing roller to achieve the final embossed product. However, there are significant drawbacks to using the prior art methods for embossing flexible packaging materials.

When a flexible packaging material is to be used for the enclosure of food products or other perishables, the barrier properties of the packaging material are of great importance. It is usually desired that the packaging material have oxygen barrier properties, moisture barrier properties, light barrier properties or a combination of these properties. Several prior art methods of embossing of a packaging material involve embossing the flexible packaging material after it is laminated. These prior art methods are unsatisfactory in that they disrupt the material having the barrier properties and thereby greatly diminish those properties.

In an effort to solve the problems associated with embossing a packaging material after it is laminated, prior art methods arose wherein a second layer of the packaging material is embossed and then laminated to a barrier layer. The disadvantage of this method, however, is that the process of laminating subsequent to embossing results in a flattening or ironing out of the embossed pattern.

Therefore, what is needed in the art is a method and a system for making embossed packaging materials that do not greatly disrupt the desired barrier properties of the packaging material and/or do not substantially flatten the embossed pattern on the flexible packaging material.

SUMMARY OF INVENTION

The present invention provides a novel method and system for extrusion embossing that remedies the deficiencies of prior art methods of embossing. In particular, the present invention provides a method and system for embossing a multi-layer flexible packaging material whereby one layer is embossed simultaneously with the extrusion of an adjacent layer and the lamination of an additional layer.

In one embodiment of the present invention, the system comprises an embossing roller and an anvil roller positioned against the embossing roller so as to form a nip between the embossing roller and the anvil roller, a means for moving the flexible packaging material through the assembly of rollers, and an extrusion die. Preferably, the system also comprises a pressure roller for pressing the embossing roller against the anvil roller.

A three-layered flexible packaging material is formed and embossed using one embodiment of the present invention in the following manner. A first layer of pre-formed material is fed in sequence to a pressure roller, an embossing roller and a nip between the embossing roller and an anvil roller. Simultaneously, a third layer of pre-formed material is fed in sequence to the anvil roller and the nip between the embossing roller and the anvil roller. Also simultaneously, a molten sheet of a second layer is extruded from an extrusion die and deposited between the first layer and the third layer at the location of the nip of the embossing roller and anvil roller.

The method and system of the present invention provide many advantages over the prior art. For example, the present invention avoids or limits the loss of barrier properties in a flexible packaging material that typically accompanies the embossing of the material. The present invention avoids or limits the loss of the embossed pattern on the flexible packaging material during production processing of the material. It is also expected that the present invention reduces the coefficient of friction of the surface of the flexible packaging material. Reducing the coefficient of friction results in the improved processing of the material on a "Form, Fill and Seal" (F/F/S) machine and possibly reduces or ameliorates the need to incorporate slip agents into the material. Finally, it is expected the present invention improves the "hand" of stiffness of the embossed flexible packaging material and thereby permits the down gauging of the material's thickness.

Other objects, features and advantages of this invention will be apparent after a review of the following detailed description of disclosed embodiments, the figures and the appended claims.

DETAILED DESCRIPTION OF THE FIGURES

Figure 1B:
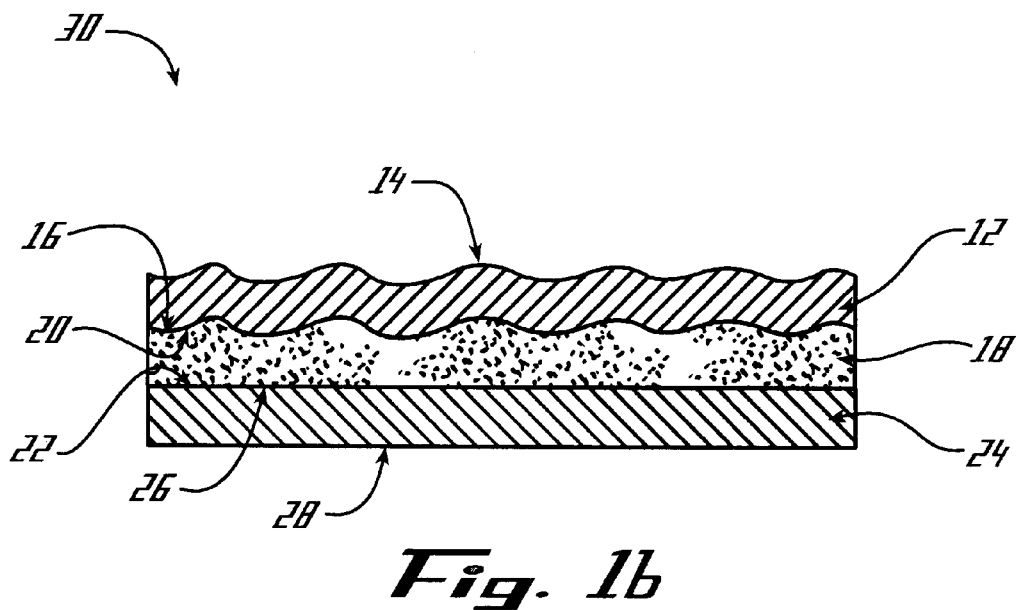

FIGS. 1a–b are cross-sectional views of flexible packaging materials produced using embodiments of the present invention.

FIG. 2 schematically illustrates the production of an embossed flexible packaging material using one embodiment of the system of the present invention.

FIG. 3 is a cross-sectional view of one embodiment of an embossing roller comprising an elastomeric embossing die.

DETAILED DESCRIPTION OF THE FIGURES

The present invention comprises a novel method and system for making an embossed multi-layer flexible packaging material. In particular, the present invention provides a method of extrusion embossing a flexible packaging material. The method preferably reduces the loss of barrier effects of the flexible packaging material upon embossing the material and/or improves preservation of the embossed pattern throughout production processing of the material. As used herein, the term "embossed" refers to a material having a partially raised surface and the terms "embossing" and "emboss" refer to the act of making the embossed material. The raised surface may take the shape of a letter, a number, a symbol, a design, a logo or any combination thereof. As used herein, the term "embossed pattern" refers to a raised surface on a flexible packaging material that takes the shape of letters, numbers, symbols, any design or logo, or any combination thereof.

As also used herein, the term "flexible packaging material" refers to any flexible or partially flexible sheet material. The flexible packaging material may contain one or more thermoplastic materials, including but not limited to, polypropylenes polyethylenes and polyamides, one or more thermoset materials, including but not limited to, polyester, one or more heat-sealable materials, including but not limited to, ionomers, ethylene-vinylacetate (EVA) and metallocene-polyethylene (M-PE), and nonpolymers, like papers and foil, or any compatible combination thereof. In one embodiment, the flexible packaging material has three layers, however, it is to be understood that the flexible packaging material may contain more than three layers.

The present invention provides a novel method of making an embossed multi-layer flexible packaging material. The present invention includes a method of making an embossed flexible packaging material that comprises simultaneously embossing a pre-formed first layer 12 of the flexible packaging material 30, extruding a second layer 18 of the flexible packaging material 30 adjacent to the first layer 12, joining the first layer 12, the second layer 18 and a pre-formed third layer 24 of the packaging material 30 with pressure, wherein the third layer 24 is joined adjacent to the second layer 18. As used herein, the term "pre-formed" refers to a solid, non-liquid and non-molten material.

In addition to providing a method of making an embossed multi-layer flexible packaging material, the present invention provides a system for making an embossed multi-layer flexible packaging material. In one embodiment, the system comprises an embossing roller 50, an anvil roller 60 positioned against the embossing roller 50 so as to form a nip 80 between the embossing roller 50 and the anvil roller 60 for receiving the material through the rollers, a first feeder for feeding a pre-formed first layer of the packaging material to the nip 80, a second feeder for feeding a pre-formed third layer of the packaging material to the nip 80, and an extrusion die 70. In a preferred embodiment, the system of the present invention further comprises a pressure roller 40 for pressing the embossing roller 50 against the anvil roller 60.

In making an embossed multi-layer packaging material using one embodiment of the method and system of the present invention, the first layer 12 is fed in sequence to an embossing roller 50 and a nip 80 between the embossing roller and an anvil roller 60. The first layer 12 is fed to the nip 80 via a first feeder, wherein the first feeder comprises one or more rollers and an unwinding system. Simultaneously, the third layer 24 is fed in sequence to the anvil roller 60 and the nip 80. The third layer 24 is fed to the nip 80 via a second feeder, wherein the second feeder comprises one or more rollers and an unwinding system. Also simultaneously, a molten sheet of the second layer 18 is extruded from an extrusion die 70 and deposited between the first layer 24 and the third layer 24 at the location of the nip 80. Preferably, the molten sheet of the second layer 18, leaves the extrusion die 70 at a temperature of approximately 500° to 620° F., and more preferably, 550° F. In a further preferred embodiment, the molten sheet of the second layer 18 is extruded from the extrusion die 70 such that the final thickness at the point of lamination is approximately 0.3 to 2 mil, and more preferably approximately 0.5 to 1.0 mil.

In one embodiment of the present invention, one, two or all of the pressure roller 40 the embossing roller 50 and the anvil roller 60 are chilled continuously throughout the production processing. Chilling one, two or all of the pressure roller 40 the embossing roller 50 and the anvil roller 60 serves the purpose of lowering the temperature of and solidifying the molten sheet of the second layer 18. According to the present invention, the pressure roller 40 is chilled to approximately 55° F. and the anvil roller 60 is chilled to approximately 55° F. Often the rollers are chilled such that, under dynamic operating conditions, the surface is maintained slightly above the ambient dew point to minimize condensation. Even though the chill water may be 55° F., because of heat transfers, the surface of the rollers may be approximately 70° F. The pressure roller 40 is preferably approximately 10–12 inches in diameter, and more preferably 10 inches in diameter, and the anvil roller 60 is preferably approximately 24–36 inches in diameter, and more preferably 24 inches in diameter or 36 inches in diameter. The pressure roller 40 and the anvil roller 60 are preferably rigid and may comprise materials including, but not limited to, steel, chrome plated and stainless steel.

The pressure roller 40 and the anvil roller 60 also facilitate the joining the individual layers that make up the flexible packaging material by applying pressure to the flexible packaging material and the individual layers as they are brought together. In operation, the pressure roller 40, the embossing roller 50 and the anvil roller are nipped together. Uniformity of the nip pressure is achieved by controlling the pressure to air cylinders that are linked to each end of the embossing roller independently. Pressure at each nip is preferably 10–150 PLI (pounds per lineal inch) and more preferably 20–40 PLI.

The system described herein also comprises an embossing roller. Preferably, the embossing roller 50 comprises an elastomeric embossing die 52 and a steel base 54. The diameter of the embossing roller 50 is preferably 4–12 inches, and more preferably 6–8 inches. The elastomeric embossing die may comprise materials including, but not limited to, silicone rubber, ethyl propylene diamine monomer (EPDM), a silicone/EPDM mixture, a neoprene and a photopolymer, or any compatible combination thereof. In a preferred embodiment, the embossing roller 50 comprises silicone rubber. In a further preferred embodiment, the embossing roller 50 comprises silicone rubber and EPDM.

As shown in FIG. 3, the elastomeric embossing die 52 may be a sleeve or sheet that is placed onto and around a steel base 54 of the embossing roller 50. It is to be understood that the width of both the elastomeric embossing die and the steel base 54 may vary. The elastomeric embossing die 52 comprises a raised design that may be achieved by any method well known to those of skill in the art. In one embodiment, the elastomeric embossing die 52 is a continuous polymer covering on the embossing roller 50. The continuous polymer preferably comprises silicone or a silicone/EPDM mixture. In a further preferred embodiment, the raised design is directly laser engraved onto the continuous polymer covering. In another embodiment, the elastomeric embossing die 52 comprises an embossing plate already having a raised design, wherein the embossing plate is wrapped around the embossing roller 50. In a preferred embodiment, the embossing plate is a photopolymer plate with a polyester backing that is wrapped around a core comprising rubber, silicone or EPDM. In each of the aforementioned embodiments, the elastomeric embossing die 52 desirably has one or more of the following properties: abrasion resistance, temperature resistance up to and including 500° F., good release properties and good resilience.

Although the elastomeric embossing die only makes contact with the first layer 12 of the flexible packaging material, both the first layer 12 and the second layer 18 of the flexible packaging material 30 may retain the embossed pattern. The elastomeric embossing die makes contact with side 14 of the first layer 12, as shown in FIG. 1b. As side 14 conforms to the raised design on the elastomeric embossing die, it is expected that side 16 of the first layer 12 and side 20 of the second layer 18 also conform to a lesser degree to the raised design on the elastomeric embossing die. It is preferred that neither side 22 of the second layer 18 nor side 26 of the third layer 24 conform to the raised design. Although the third layer 24 may shrink and also conform to the embossed pattern, it is an object of the present invention to reduce or avoid such conformation since the very thin layer of deposited metal may become stressed which reduces the barrier properties of the third layer.

Because the height of the raised design directly correlates with the amount of air trapped between the first layer 12 and second layer 18, and trapped air is undesirable in that it may reduce bond strength, the height of the raised design is limited. Preferably, the height of the raised design is less than approximately 20 mil. More preferably, the height of the raised design on the embossing roller 50 is between approximately 5 and 10 mil.

The flexible packaging material produced by the above-described method and used in the below-described system comprises several layers. In one embodiment, the flexible packaging material 30 has a first layer 12, a second layer 18 and a third layer 24. Prior to the formation of the flexible packaging material 30, the first layer 12 is a pre-formed sheet of material. The first layer 12 may comprise one or more thermoplastic polymers, one or more thermoset polymers, or a foil. If the first layer comprises a foil, a dead soft foil is preferred. The thermoplastic polymers suitable for use in the first layer 12 include, but are not limited to, polypropylenes, polyethylenes and nylon (polyamide). The thermoset polymers suitable for use in the first layer 12 include, but are not limited to, polyester. Suitable combinations of thermoplastic polymers for use in the first layer 12 are well known to those of skill in the art and include, but are not limited to polyolefin/ethylene-vinyl alcohol/polyolefin and polyolefin/polyamide/polyolefin compositions. In a preferred embodiment, the first layer 12 of the flexible packaging material comprises an oriented polypropylene. In another preferred embodiment of the present invention, the first layer 12 of the flexible packaging material comprises a polyester.

One advantage of the present invention is that it allows for the combination of printing and embossing on the same flexible packaging material. Therefore, if desired, the first layer 12 may be pre-printed. Preferably the first layer 12 is reverse pre-printed on the inner side 16 of the first layer 12.

During the formation of the flexible packaging material 30, the second layer 18 is a molten material that cools to a solid material. The second layer 18 may comprise one or more thermoplastic polymers. When the second layer 18 comprises more than one polymer, the polymers may either be mixed or co-extruded. Preferably, the polymers comprising the second layer 18 are adhesive to the materials comprising the first layer 12 and the third layer 24. Corona treatment may be used to raise the surface energy of the first layer 12 or third layer 24 and thereby improve adhesion of these layers to the second layer 18. The thermoplastic polymers suitable for use in the second layer 18 of the flexible packaging material include, but are not limited to, polypropylenes and polyethylenes. In a preferred embodiment, the second layer 18 comprises a polyethylene. In a further preferred embodiment, the polyethylene of the second layer 18 is a low density polyethylene. In another embodiment, the second layer comprises a co-extrusion of polyethylene and EVA wherein there is either one layer of EVA, or two layers of EVA that surround a polyethylene layer.

Prior to the formation of the flexible packaging material 30, the third layer 24 is a pre-formed sheet of material. The third layer 24 may comprise one or more thermoplastic polymers, one or more thermoset polymers, paper, or foil. The thermoplastic polymers suitable for use in the third layer 24 include, but are not limited to, polypropylenes, polyethylenes ionomers and metallocene-catalyzed polyethylene. The thermoset polymers suitable for use in the third layer 24 include, but are not limited to polyester. Preferably, the third layer 24 is metalized. More preferably, the third layer 24 comprises an aluminum metalized polypropylene and most preferably, the third layer 24 comprises an aluminum that is vacuum deposited on a polypropylene.

When the flexible packaging material is later formed into a package, filled and sealed, the first layer 12 is oriented toward the outside of the package and the third layer 24 is oriented toward the inside of the package, facing the contents of the package. Therefore, in a preferred embodiment, the third layer 24 has one or more barrier properties, including, but not limited to oxygen barrier properties, light barrier properties and moisture barrier properties. In a further preferred embodiment, once the flexible packaging material 30 is formed and embossed, a barrier property of the third layer 24 is not reduced by more than approximately 0 to 40% (the reduction percentage), or more preferably 0 to 20%. As used herein, the reduction percentage is defined as the percentage of the level of a barrier property after formation of the flexible packaging material as compared to the level of the same barrier property of the individual layers prior to formation of the flexible packaging material. It is to be understood that the layers of the flexible packaging material other than the third layer may also have one or more barrier properties.

Examples of flexible packaging materials made using the above-described method and system of the present invention are as follows. In one embodiment of the present invention, the flexible packaging material comprises a first layer 12 of oriented polypropylene, a second layer 18 of low density polyethylene, and a third layer 24 of aluminum metalized polypropylene. In another embodiment of the present invention, the flexible packaging material comprises a first layer 12 of clear polyester, a second layer 18 of low density polyethylene, and a third layer 24 of aluminum metalized polyester.

The advantages of the novel methods and systems for extrusion embossing a flexible packaging material described herein are numerous. The present invention avoids or limits the loss of barrier properties in the flexible packaging material that typically accompanies embossing of the material. The present invention also avoids or limits the loss of the embossed pattern on the flexible packaging material during production processing of the material. It is also expected that the present invention reduces the coefficient of friction of the surface of the flexible packaging material. Reducing the coefficient of friction results in the improved processing of the material on a F/F/S machine and possibly reduces or ameliorates the need to incorporate slip agents into the material. It is expected the present invention improves the "hand" of stiffness of the embossed flexible packaging material and thereby permits the down gauging of the material's thickness. Finally, the present invention provides a significant cost advantage since embossing and laminating the packaging material in a single step eliminates an entire operation step during production processing.

It should be understood that the foregoing relates to particular embodiments of the present invention and that numerous changes may be made therein without departing from the scope of the invention as defined by the following claims.

I claim:

1. A method of making an embossed multi-layer flexible packaging material comprising:

feeding a pre-formed first layer to an embossing roller and a nip between the embossing roller and an anvil roller, the embossing roller comprising an elastomeric embossing die and the anvil roller being rigid;

feeding a pre-formed third layer to the anvil roller and the nip, the third layer comprising a metal foil or a metalized polymer and having one or more barrier properties;

extruding a second layer from an extrusion die and depositing the second layer between the first layer and the third layer at the nip;

embossing the first layer of the packaging material with the elastomeric embossing die; and joining the first layer, the second layer and the third layer of the packaging material with pressure at the nip, wherein the second layer is between the first layer and the third layer and the steps of embossing, extruding, and joining are performed simultaneously and such that the one or more barrier properties are not reduced by more than 40%.

2. The method of claim 1, wherein the elastomeric embossing die comprises silicone rubber.

3. The method of claim 2, wherein the elastomeric embossing die further comprises an ethyl propylene diamine monomer.

4. The method of claim 1, wherein the embossing roller comprises a raised design and wherein the raised design is approximately less than 20 mil in height.

5. The method of claim 1, wherein the second layer is extruded through the extrusion die at approximately 500° F.

6. The method of claim 1, wherein the one or more barrier properties are not reduced by more than 20%.

7. The method of claim 1, wherein the one or more barrier properties are selected from the group consisting of an oxygen barrier property, a light barrier property and a moisture barrier property.

8. The method of claim 1, wherein the first layer of the packaging material comprises aluminum foil or one or more polymers selected from the group consisting of a thermoplastic polymer and a thermoset polymer.

9. The method of claim 1, wherein the first layer of the packaging material comprises a thermoplastic polymer selected from the group consisting of a polypropylene and a polyethylene.

10. The method claim 1, wherein the first layer of the packaging material comprises an oriented polypropylene.

11. The method of claim 1, wherein the first layer of the packaging material comprises a polyester.

12. The method of claim 1, wherein the second layer of the packaging material comprises a thermoplastic polymer.

13. The method of claim 1, wherein the second layer of the packaging material comprises a thermoplastic polymer selected from the group consisting of a polypropylene and a polyethylene.

14. The method of claim 1, wherein the second layer of the packaging material comprises a low density polyethylene.

15. The method of claim 1, wherein the second layer of the packaging material comprises two co-extruded polymers.

16. The method of claim 1, wherein the third layer of the packaging material comprises one or more polymers selected from the group consisting of a thermoplastic polymer and a thermoset polymer.

17. The method of claim 1, wherein the third layer of the packaging material comprises a thermoplastic polymer selected from the group consisting of a polypropylene and a polyethylene.

18. The method of claim 1 wherein the third layer of the packaging material comprises aluminum metalized polypropylene.

19. The method of claim 1 wherein the anvil roller is chilled.

* * * * *